Patented Aug. 18, 1936

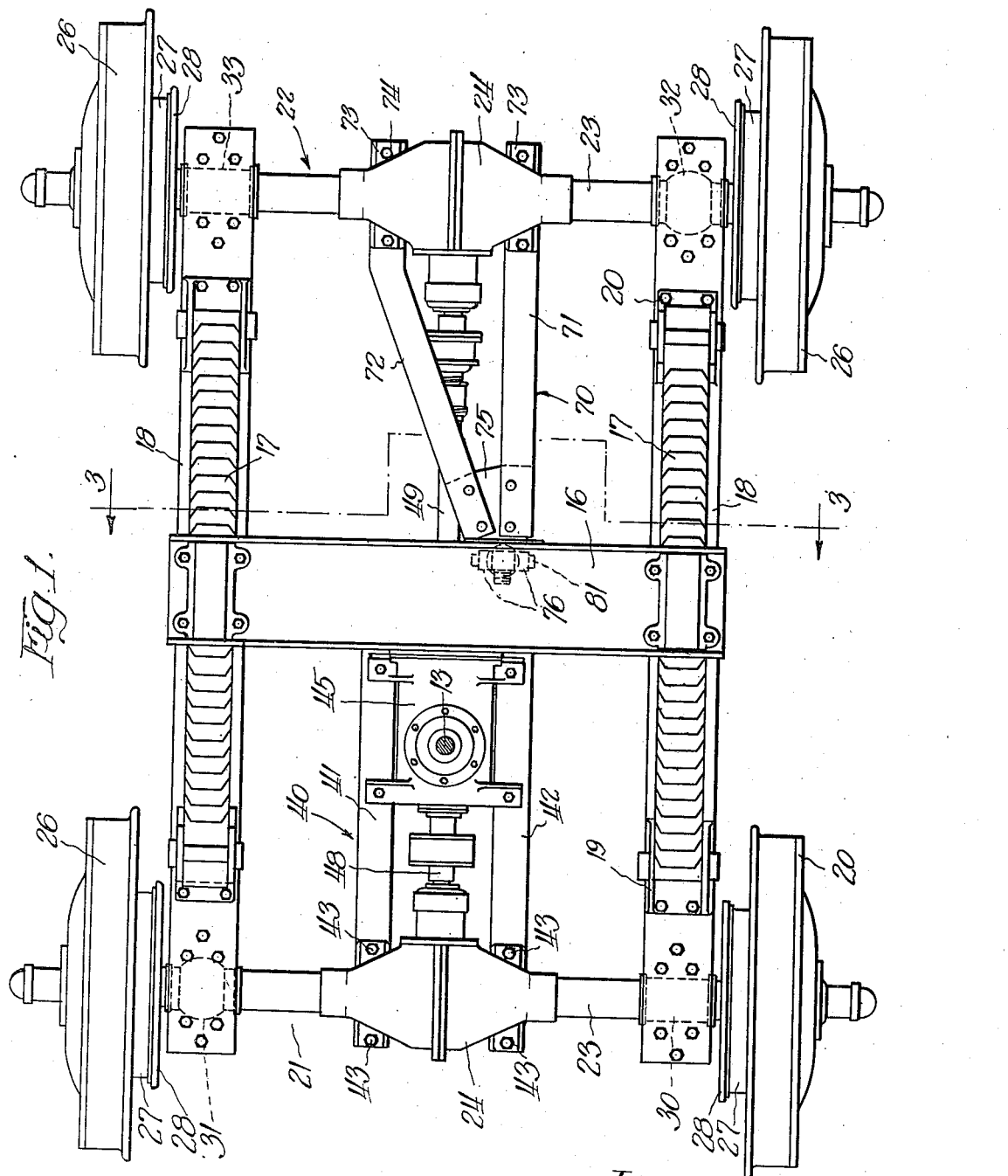

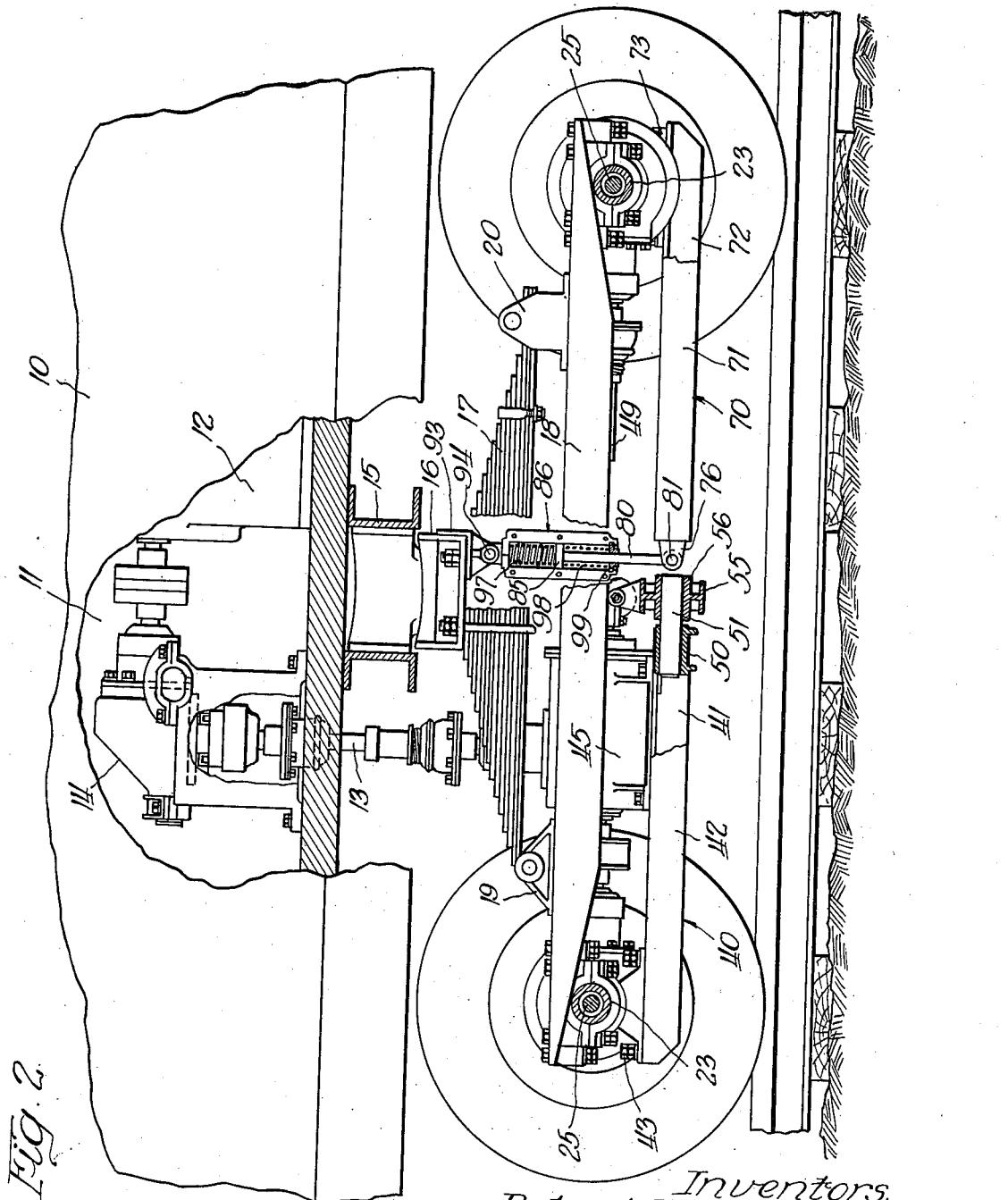

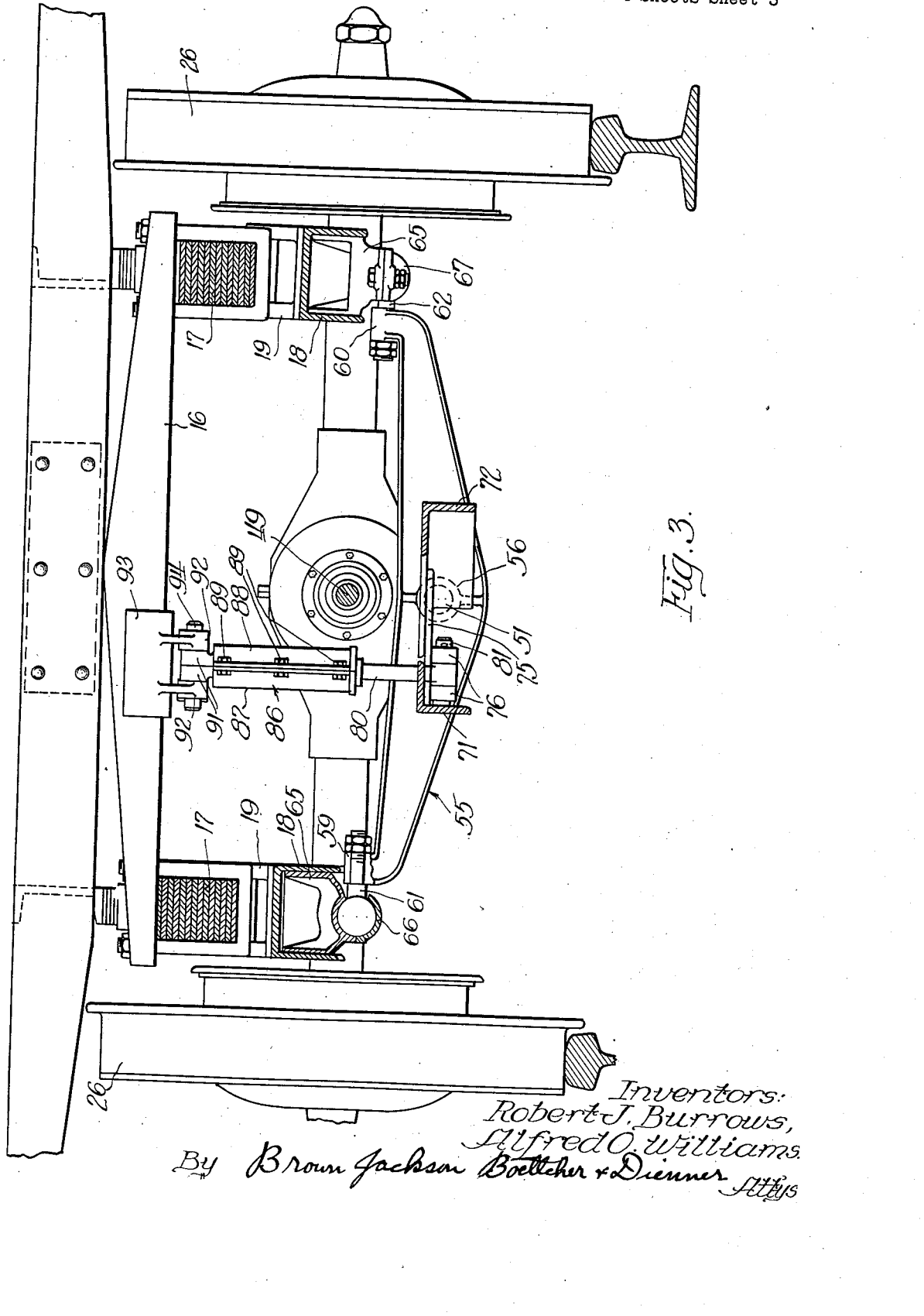

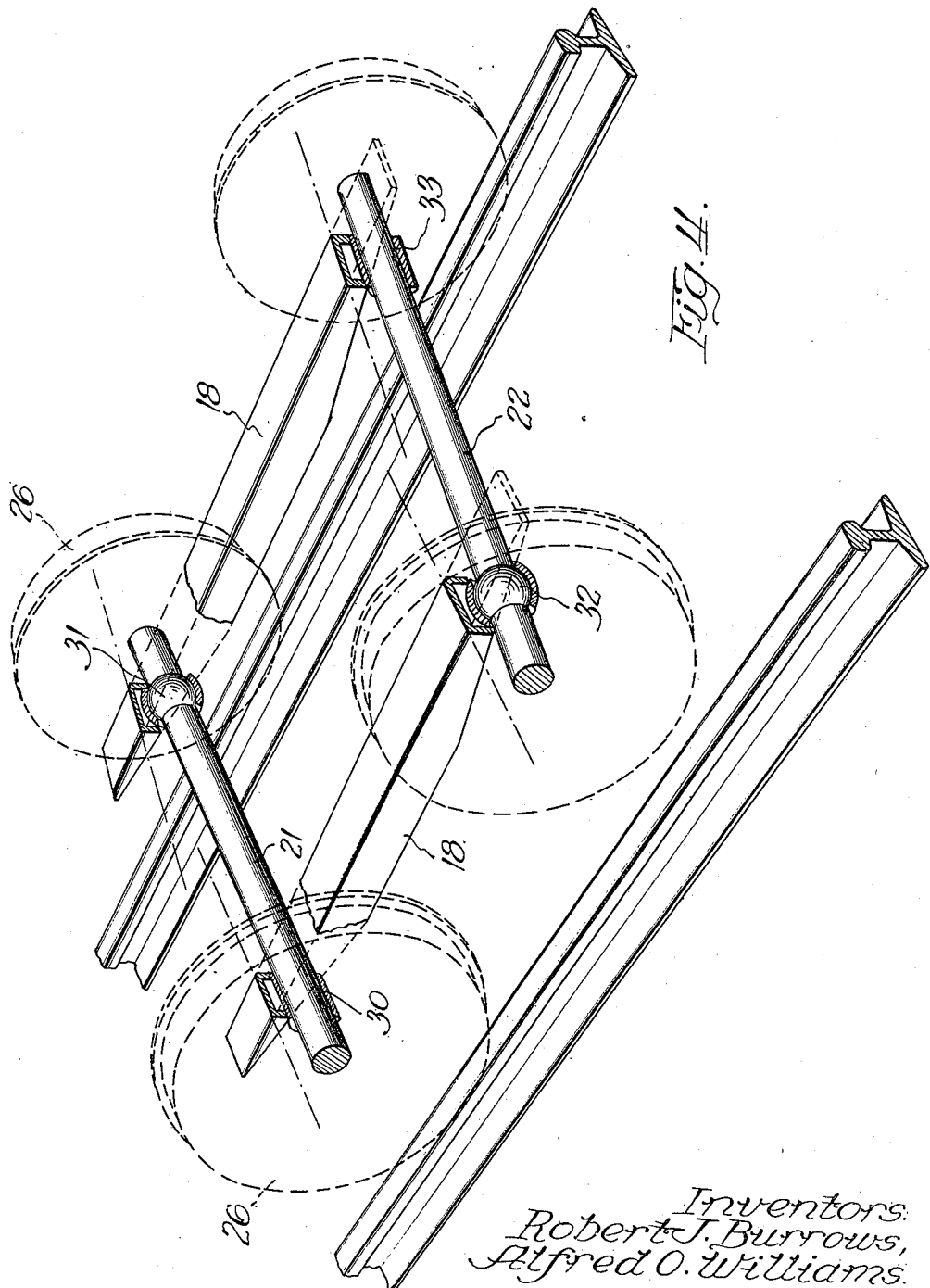

2,051,074

UNITED STATES PATENT OFFICE 2,051,074

RAIL CAR

Robert J. Burrows and Alfred O. Williams, Battle Creek, Mich., assignors to Clark Tructractor Company, Battle Creek, Mich., a corporation of Michigan Application August 29, 1932, Serial No. 630,961

23 Claims. (Cl. 105—182)

The present invention relates generally to railway transportation and is particularly concerned with the provision of a new and improved rail car of relatively light weight construction, such as of the type employing rubber tired wheels or other resilient wheel construction, especially those wherein demountable tires are utilized. The present invention contemplates the provision of a new and improved truck for rail cars and the like wherein a more or less flexible construction is realized which will permit a relatively free up and down movement of any of the supporting wheels without disturbing the position of the other supporting wheels. This is of especial importance where demountable tires are employed in that by virtue of such construction one wheel may be raised sufficiently to permit the tire with its associated flange to be removed from the wheel with the flange thereof clearing the rail.

Another object of the present invention is the provision of a new and improved rail car truck wherein driving and braking reactions are efficiently taken care of and in which yielding means is also provided for the purpose of cushioning torque shocks, such as those due to too sudden application of power or other variations thereof, and preventing the same from being imposed upon the running gear of the truck. It is also an important object of the present invention to arrange such cushioning means in connection with differential drive means wherein the drive is divided between two or more driving axles. Where such differential mechanism is present only one of such cushioning mechanisms is required for protecting both driving axles from torque shocks.

These and other objects of the present invention will be apparent from a consideration of the following detailed description of the preferred structural embodiment of the present invention, taken in conjunction with the accompanying drawings illustrating such embodiment.

In the drawings:

Figure 1 is a top plan view of a truck for a rail car embodying the principles of the present invention;

Figure 2 is a side elevation, partly in section, of the rail car truck and the driving means therefor;

Figure 3 is a section taken along the line 3—3 of Figure 1; and

Figure 4 is a schematic view illustrating the arrangement of the truck frames when one wheel on one corner of the truck is raised.

Referring now more particularly to Figures 1 and 2, it will be seen that our improved rail car includes a car body 10 having a power plant compartment 11 in which is disposed a motor or other source of power 12. The power plant 12 drives a vertically disposed power shaft 13 through a gear box 14 which may be of the construction disclosed and claimed in our copending application, filed May 9, 1932, Serial No. 610,079. The rail car 10 is preferably provided with front and rear trucks, and preferably the front truck 10 is the driving truck while the rear truck is a trailing truck, as illustrated in our copending application referred to above. In Figure 2 we have shown the present invention as embodied in a driving truck which may be disposed at the front of the rail car, although the features of the present invention are equally applicable to a truck of the trailer type.

As mentioned, the truck shown in Figure 2 is a driving truck and is of the four wheel type having substantially rigid side frames 18. Secured to the underside of the car body is a car bolster 15 pivotally supported on a truck bolster 16. The latter is carried upon longitudinally disposed semi-elliptic springs 17 having their ends connected by spring supports 19 and 20 with the side frames 18 which preferably are in the form of channel beams supported upon two driving axles indicated by the reference numerals 21 and 22. Each of the axles include an axle housing 23 having an enlarged central portion 24 to provide for the necessary gear connections between the driving shaft means and the axle shafts 25 journaled within the axle housings 23 and provided at their outer ends with supporting wheels 26. The wheels 26 may be of conventional construction or they may be of the type disclosed and claimed in our copending application filed April 6, 1932, for a wheel, Serial No. 603,463. The wheel illustrated in the drawings is of the latter type. Each of the supporting wheels includes, in addition, a brake drum 27 and a stationary brake support 28 suitably anchored to the axle housing 23. The side frames or channel beams 18 are supported upon the axle housings 23 through bearing means of novel construction and which provides for limited rotative and angular movement between the beams and the axles, whereby a flexible frame construction is provided.

As best shown in Figure 4, the novel bearing means for the axle housings 23 includes a cylindrical bearing member 30 and a spherical bearing member 31 for the axle 21, and a spherical bearing member 32 and a cylindrical bearing member 33 for the other axle 22. Preferably, the spherical bearing or journal means 31 and 32 are disposed at diagonally opposite corners of the truck, and the same is true of the cylindrical bearing or journal means 30 and 33.

The practical effect of the above described supporting means for carrying the side members or channel beams upon the axles 21 and 22 is illustrated diagrammatically in Figure 4 wherein the frames and axles are shown in the position they assume when one wheel is jacked up, as may be necessary in order to remove the wheel or the tire. Referring to Figure 4, it will be observed that each of the side frames 18 includes a cylindrical bearing at one end and a spherical bearing at the other end, there being a cylindrical bearing and a spherical bearing on each axle. Figure 4 illustrates the position where the right front wheel has been raised. From Figure 4 it will be seen that raising the right front wheel causes the right channel beam 18 to swing about a substantially transverse horizontal axis which is defined by the rear axle 21, the front axle 22 being shifted angularly in a vertical transverse plane with respect to the right hand side frame 18. The spherical bearing construction 32 is provided for the purpose of permitting the angular displacement between the front axle 22 and the right hand channel beam 18 in the position illustrated in Figure 4. Since the angular relation between the front axle 22 and the horizontal plane passing through the rear axle 21 causes a change in the angular relation between the front axle 22 and the right hand side frame 18, a similar angular displacement will be imparted to the left hand channel beam 18 because the connection between the front axle 22 and the left hand beam 18 is in the nature of a cylindrical bearing which causes the left hand beam to follow the front axle 22 in its angular movement. Since the left hand side frame or channel beam 18 follows the front axle 22, there will necessarily occur an angular movement between the left hand beam 18 and the rear axle 21. This angular displacement is accommodated by the spherical bearing 31 by which the rear end of the left hand beam 18 is supported on the rear axle 21. Therefore, when any one of the four supporting wheels for the truck is raised, one of the channel frames 18 is raised about a transverse horizontal axis while the other channel beam is rotated through a relatively small arc about its longitudinal axis, the two side frames thus taking a warped position. This warped position, while necessary to accommodate variations in height of the supporting wheels, will not be transmitted to the car body 10 because the supporting springs 17 will absorb the relatively small changes in position of the channel beams 18.

By virtue of the above construction not only is it possible to raise one wheel sufficiently to remove the tire but a construction is realized in which inequalities of the road bed will be accommodated by the flexible construction of the truck and will not be transmitted directly to the car body 10.

Since both of the axles 21 and 22 are driving axles and since both are provided with braking means, it is desirable to provide some form of means for resisting the torque reactions developed during the transmission of driving force or the application of the brakes. The torque arm for the rear axle 21 is similar to the corresponding torque arm illustrated in our first mentioned copending application. The rear torque arm is indicated in its entirety by the reference numeral 40 and, as best shown in Figure 1, comprises a pair of angles 41 and 42 secured at their rear ends to the rear axle housing 23. For this purpose the central portion 24 of the rear axle housing is provided with suitable bosses to receive the angle irons 41 and 42, the latter being secured to said bosses by bolts 43 or the equivalent. A differential housing 45 is supported upon the two angle irons 41 and 42. The different housing 45 includes suitable differential mechanism deriving power from the vertically disposed power shaft 13, the drive being divided by said differential mechanism between one driving shaft section 48 connected to drive the rear axle shaft and a forward shaft section 49 connected to drive the forward axle shaft.

The forward ends of the angle bars 41 and 42 are connected together by a casting member 50 in which is disposed a swivel pin 51, the latter being preferably welded or otherwise rigidly mounted in the casing member 50. The forward end of the torque arm 40 is supported, through said swivel pin 51, by means of a transversely disposed yoke 55 (see Figure 3) having a suitable boss 56, to slidably and rotatably receive the swivel pin 51, and apertured ends 59 and 60 to receive spherical bearing members 61 and 62. The spherical bearing members 61 and 62 are in the form of balls and adapted to be supported from the side frames 18 by suitable socket means 65 and 66 securely mounted between the flanges of the beams 18. Semi-spherical caps 66 and 67 are adapted to be detachably mounted on the socket members 65 whereby the heads or balls 61 and 62 are held in position.

The purpose of the ball and socket support for the transversely disposed yoke is to accommodate the relative movement between the channel beams 18, see Figure 4, while providing a support or anchor for the forward or inner end of the rear torque arm 40.

The torque arm for the forward axle 22 is indicated in its entirety by the reference numeral 70 and from Figure 1 will be seen to comprise a pair of angle bars 71 and 72, the latter being secured at their outer or forward ends to suitable bosses 73 formed on the central portion 24 of the axle housing 23, the angle bars being secured thereto by bolts 74 or the equivalent. The angle bar 71 is substantially straight while the companion bar 72 is bent so that its rear or inner end is brought close to the inner end of the angle bar 71 and secured thereto by means of a gusset plate 75 connected by rivets or the equivalent to the angle bars 71 and 72. The gusset plate 75 carries a pair of apertured lugs 76 between which is received the lower end of a plunger rod 80, the latter being pivotally connected therewith by means of a pivot pin 81.

The upper end of the plunger rod 80 terminates in a head portion 85 which is shiftably disposed with a cylindrical member 86 comprising two separable parts 87 and 88 secured together by bolts 89 or the equivalent. The upper end of the cylindrical member 86 terminates in lugs 91 adapted to be received between the apertured ears 92 formed on a bracket member 93 secured in any manner desired to the truck bolster 16. A pivot pin 94 serves to pivotally connect the upper end of the cylindrical member 86 to the truck bolster. Springs 97 and 98 are carried within the cylindrical member 86, the spring 97 being disposed above the head 85 while the lower spring 98 surrounds the plunger 80 and is confined between the head 85 and a closure member 99 fitted within a suitable groove formed on the separable sections 97 and 98, as best shown in Figure 2.

The drive is transmitted to the axles 21 and 22 through the vertically disposed power shaft 13, the differential mechanism 45, and the longitudinally disposed driving shaft sections 48 and 49. The reactions developed during the transmission of force to the driving axles tend to cause the axle housings 23 to rotate relative to the rigid channel beams 18. This tendency is resisted by the two torque arms 40 and 70 which, since their inner ends are securely anchored, effectively restrains the housings 23 from rotating. The inner end of the torque arm 40 is anchored directly to the side beams 18 but the inner end of the oher torque arm 70 is anchored by means of yielding or cushioning means which permits of a limited amount of angular movement of the torque arm 70. Since the drive to the two axles 21 and 22 is transmitted through differential mechanism 45, torque shocks, as those arising due to too sudden application of power or other source, will be free to go to either axle, and therefore if one of the axles yields the torque shocks will all be effectively absorbed. The provision of the cushioning means 86 effectively serves, therefore, to cushion the torque shocks and to prevent the transmission thereof to either of the driving axles.

In this connection it is important to observe that the torque arm 70 is anchored, not merely to the side beams 18, but to the truck bolster 16 which is supported through spring means 17 on the side beams 18. Thus, torque shocks will be absorbed, not only by virtue of the cushioning means 86, but also because such shocks will be transmitted to the truck bolster 16 and from there will be absorbed either by the springs 17 or by the effect of slightly raising the car body 10, depending on the direction in which the shocks are imposed. The springs 97 and 98 and the cushion means 86 are preferable, however, because of the increased responsiveness which such structure provides. Nevertheless, the provision of the cushioning means 86 and the anchoring of the inner end of the torque arm 70 to the truck bolster 16, rather than to the side frames 18, are features each cooperating with the other to provide a cushioned drive for the driving truck axles.

The provision of the swiveled connection of the other torque arm 40 to the centrally disposed yoke provides an effective anchoring means for the rear torque arm without in any way affecting the required flexibility of the side frames 18 relative to each other, this being secured through the universal connections between the ends of the yoke member 55 and the respective side beams 18. The relative angular displacement between the side frame 18 and the truck bolster 16 when one wheel is lifted is taken care of by the flexibility of the supporting springs 17.

While we have shown and described above the preferred structural embodiment, it will be apparent to those skilled in the art that the present invention is not to be limited to the specific details shown and described, but that, in fact, widely different means may be employed in the practice of the broader aspects of our invention.

What we claim, therefore, and desire to secure by Letters Patent is:

1. A rail car truck comprising a pair of rigid side beams, a pair of axles carried thereby adjacent the ends thereof, bearing means for one of said axles comprising a spherical bearing associated with one of said beams and a cylindrical bearing for the other beam, and bearing means for the other axle comprising a spherical bearing for said other beam and cylindrical bearing for said first named beam.

2. A rail car truck comprising side beams, a pair of axles supporting said beams, journal means supporting said beams on one axle comprising bearing means for one of said beams providing for angular displacement of the axle with respect to said one beam and bearing means for the other beam arranged to prevent angular displacement of the axle with respect to that beam, and journal means supporting the beams on the other axle comprising bearing means for said second mentioned beam providing for angular displacement between said second beam and said second mentioned axle and bearing means for said first mentioned beam and arranged to prevent relative movement between said first beam and said second mentioned axle.

3. A rail car truck comprising substantially rigid side beams, a plurality of axle housings journaled on said beams, driving axles journaled within said housings, supporting wheels on said driving axles, torque arms secured to each of said axle housings and extending therefrom inwardly of the truck, the inner adjacent ends of said torque arms lying in substantially the same transverse vertical plane between the ends of said side beams, and means including cushioning means anchoring one end of at least one of said torque arms to restrain rotative movement of the associated housing.

4. A rail car truck comprising substantially rigid side beams, a spring mounted truck bolster supported thereby, a plurality of axle housings journaled on said beams, driving axles journaled within said housings, supporting wheels on said driving axles, torque arms secured to each of said axle housings, means anchoring one end of one of said torque arms to said side beams, and spring means anchoring one end of the other of said torque arms to said spring mounted truck bolster.

5. A rail car truck comprising substantially rigid side beams, a plurality of axle housings journaled on said beams, driving axles journaled within said housings, supporting wheels on said driving axles, torque arms secured to each of said axle housings and extending therefrom inwardly of the truck, the inner adjacent ends of said torque arms lying in substantially the same vertical plane midway between the ends of said side beams, cushioning means anchoring one end of at least one of said torque arms to restrain rotative movement of the associated housing, and means for driving at least one of said sides including generally longitudinal drive shaft means supported independently of said cushioned torque arm, said drive shaft means including a universal joint disposed outwardly of said cushioning means and adjacent said one axle housing.

6. A rail car truck comprising a pair of side members, a pair of rotatably mounted axle housings supporting said side members, axle shafts disposed within said housings, supporting wheels connected with said shafts, means for driving said shafts differentially, a torque arm connected with one of said axle housings and with said side members to restrain rotation of said axle housing, a second torque arm connected with the other of said axle housings, and spring means anchoring one end of said second torque arm and serving to absorb torque shocks transmitted through said differential means to both of said axle shafts.

7. A rail car truck comprising side beams, axle housings journaled for rocking movement with respect to said beams, driving shafts journaled within said housings, wheels mounted on said shafts, a spring support carried by each of said side beams, a transversely disposed truck bolster supported by said spring supports, means including a differential for driving both of said shafts, a torque arm connected with one of said axle housings, yielding means anchoring said torque arm to said bolster, and means for restraining rocking movement of the other axle housing with respect to said side beams, the yielding of said anchoring means providing for limited rocking of said one axle housing, thereby relieving shocks reacting through said differential against either of said axle housings.

8. A rail car truck comprising substantially rigid side beams, driving axles supporting said beams, each of said driving axles including an axle housing and driving shaft means disposed therein, supporting wheels on said driving shaft means, one of said axle housings being journaled for rotation in bearings carried by said side beams, a torque arm secured to said rotatable axle housing, a spring mounted bolster supported upon said side beams, and spring means anchoring one end of said torque arm to said bolster.

9. A rail car truck comprising side beams, a pair of axle housings supporting said beams, bearing means for one of said housings providing for limited rotative movement of said housing with respect to said beams, axle shafts disposed in said housings, wheels mounted on said shafts, a longitudinally disposed torque arm secured to said one axle housing, a transversely disposed yoke receiving the inner end of said torque arm and carried by said beams, and means connecting the ends of said transverse yoke to the central portions of said side beams, respectively, for universal movement with respect thereto.

10. A rail car truck comprising rigid side beams, a pair of axle housings supporting said beams, bearing means for one of said housings providing for limited rotative movement of said housing with respect to said beams, axle shafts disposed in said housings, wheels mounted on said shafts, a longitudinally disposed torque arm secured to said one axle housing, a transversely disposed yoke receiving the inner end of said torque arm, and means connecting the ends of said transverse yoke to the central portions of said rigid side beams, respectively, for universal movement with respect thereto.

11. A rail car truck comprising a pair of substantially rigid side beams, axle housings supporting said beams, axle shafts journaled within said housings, supporting wheels mounted on said shafts, one of said housings being journaled in said beams and both of said housings being connected with at least one of said beams for universal movement with respect thereto, a torque arm secured to said one housing, a centrally disposed transverse yoke member having ball and socket connections with said beams to accommodate relative movement therebetween, and means swiveling the inner end of said torque arm in said yoke member.

12. A rail car truck comprising a pair of substantially rigid beams, a pair of axle housings journaled therein, journal means for said housings providing for relative angular movement between each of said side beams and one of said housings, supporting springs carried by said side beams, a transverse truck bolster supported upon said springs, axle shafts journaled within said housings, supporting wheels mounted on said shafts, a torque arm secured to one of said housings, a transversely disposed yoke member connecting the inner end of said torque arm with said side beams, a torque arm for the other housing, and means connecting the inner end of said second torque arm with said spring supported bolster.

13. A rail car truck comprising a pair of substantially rigid channel beams, a pair of axle housings, axle shafts journaled within said housings, supporting wheels mounted on said shafts, journal means for supporting said beams on said housings, said journal means providing for relative angular displacement between each of said beams and at least one of said housings, a supporting spring mounted upon each of said channel beams, a truck bolster carried by said springs, a torque arm connected at one end with one of said housings, a transversely disposed yoke member disposed centrally of said channel beams, universal bearing means connecting the ends of said yoke member with said beams respectively, means including a swivel pin anchoring the other end of said torque arm to said yoke member adjacent the central portion thereof, a torque arm for the other housing, and double acting cushioning means anchoring the inner end of said second torque arm to said truck bolster.

14. A rail car truck comprising side frames, axle housings supporting said side frames, axle shafts journaled in said housings, supporting wheels mounted on said axle shafts, one of said housings being connected with said side frames by journal means providing for limited rotation of the housing with respect to said side frames, a spring mounted truck bolster supported on said side frames, a torque arm connected with said housing, a cylindrical member suspended from said truck bolster, a plunger movably mounted in said cylindrical member and connected with said torque arm, and spring means confined within said cylindrical member and arranged to cushion relative movement between said plunger and said cylindrical member in both directions.

15. A rail car truck comprising a pair of side frames, axle housings supporting said side frames, axle shafts journaled within said housings, supporting wheels mounted on said shafts, one of said housings being provided with bearing means by which the housing is supported for rotation relative to said side frames, said bearing means for at least one of said side frames providing for relative angulalr displacement between said housing and said one side frame, a torque arm for said housing, a spring mounted bolster carried upon said side frames, a cylindrical member pivotally connected at one end with said bolster, a plunger having one end disposed within said cylindrical member and the other end pivotally connected with said torque arm, and means disposed within said cylindrical member and cooperating with said plunger to cushion relative movement therebetween in both directions.

16. A rail car truck comprising side frames, springs carried by said frames, a transversely disposed truck bolster carried by said springs, a pair of axle housings, axle housings disposed adjacent the ends of said frames, bearing means for mounting the frames on said axle housings, said bearing means including diagonally disposed spherical bearings and diagonally disposed cylindrical bearings, whereby said side frames constitute a flexible frame construction, axle shafts journaled in said housings, supporting wheels mounted on said axle shafts, a torque arm secured at one end to one of said housings and extending longitudinally to a point substantially underneath said bolster, a transversely disposed yoke member disposed underneath said bolster, ball and socket connections supporting the ends of said yoke on said side frames, a swivel pin secured to the inner end of said torque arm and rotatably and slidably supported in the central portion of said yoke, a drive shaft section for the axle shafts of said first axle housing, a drive shaft section for the axle shafts of the other axle housing, said drive shaft sections being in axial alignment, differential means carried by said torque arm and operatively connected to differentially drive said shaft sections, the torque arm for said other axle housing including a pair of bars connected at one end to said other axle housing and having their other ends secured together and displaced laterally with respect to the vertical longitudinal plane passing through said drive shaft sections, and a spring cushion member anchoring the inner end of said second torque arm to said track bolster, said spring cushion member being pivotally connected with said bolster and said second torque arm.

17. A rail car truck comprising side beams, axle housings journaled thereon, means restraining the rotation of one of said housings with respect to said side beams, said means including a transversely disposed yoke supported on said side beams and a torque arm secured to said one housing and said yoke and disposed substantially centrally of the truck, a second torque arm connected with the other of said axle housings, and laterally disposed means for anchoring the inner end of said second torque arm.

18. A rail car truck comprising side beams, axle housings journaled thereon, axle shafts journaled within said housings, supporting wheels secured to said axle shafts, driving means for said axle shafts comprising longitudinally disposed driving shaft sections, means restraining the rotation of one of said housings with respect to said side beams, said means including a transversely disposed yoke and a centrally disposed torque arm connected with said one housing and said yoke, a second torque arm connected with the other of said axle housings, and means for anchoring the inner end of said torque arm, said means being disposed laterally with respect to the associated driving shaft section to clear the same.

19. A rail car truck comprising side beams, axle housings journaled thereon, axle shafts journaled within said housings, supporting wheels secured to said axle shafts, driving means for said axle shafts comprising longitudinally disposed driving shaft sections, a spring mounted truck bolster supported on said side beams, a yoke carried by the intermediate portions of said side beams, a torque arm connected with one of said housings and anchored to said yoke, a second torque arm connected with the other of said axle housings, and means disposed laterally with respect to the associated driving shaft section for anchoring the inner end of said second torque arm to said truck bolster.

20. A flexible truck for rail cars and the like comprising a plurality of supporting axles including axle housings and rotatable axle shafts, side frames having bearing means directly connected therewith to receive said axle housings, said bearing means providing for rotation of said axle housings with respect to the side frames supported thereby, a truck bolster, spring means supporting said bolster on said side frames, and means for anchoring certain of said axle housings to said spring supported truck bolster.

21. A flexible truck comprising a plurality of at least a pair of axles including axle housings, longitudinally disposed side frames having bearing means receiving said axle housings for rotation with respect thereto, said bearing means providing for angular movement in a transverse plane between the housings and said side frames, a truck bolster, spring means supporting the same on said side frames, a torque arm anchored to one of said housings and connected with said side frames, and a second torque arm anchored to the other housing and connected with said spring supported truck bolster.

22. A rail car truck comprising a pair of rigid side beams, a bolster supported on said beams, a pair of axles carried thereby adjacent the ends thereof, bearing means for one of said axles comprising a spherical bearing associated with one of said beams and a cylindrical bearing for the other beam, and bearing means for the other axle comprising a spherical bearing for said other beam and cylindrical bearing for said first named beam, said cylindrical bearings tending to hold said side beams in proper position.

23. A rail car truck comprising side beams, a bolster, spring means supporting said bolster on said beams, a pair of axles supporting said beams, journal means supporting said beams on one axle comprising bearing means for one of said beams providing for angular displacement of the axle with respect to said one beam and bearing means for the other beam arranged to prevent angular displacement of the axle with respect to that beam, and journal means supporting the beams on the other axle comprising bearing means for said second mentioned beam providing for angular displacement between said second beam and said second mentioned axle and bearing means for said first mentioned beam and arranged to prevent relative movement between said first beam and said second mentioned axle.

ROBERT J. BURROWS.
ALFRED O. WILLIAMS.